United States Patent
Allen et al.

(10) Patent No.: US 9,956,757 B2
(45) Date of Patent: May 1, 2018

(54) ACRYLATE INK COMPOSITIONS FOR INK-BASED DIGITAL LITHOGRAPHIC PRINTING

(71) Applicant: XEROX CORPORATION, Norwalk, CT (US)

(72) Inventors: C. Geoffrey Allen, Waterdown (CA); Mihaela Maria Birau, Mississauga (CA); Carolyn Moorlag, Mississauga (CA); Aurelian Valeriu Magdalinis, Newmarket (CA)

(73) Assignee: XEROX CORPORATION, Norwalk, CT (US)

( * ) Notice: Subject to any disclaimer, the term of this patent is extended or adjusted under 35 U.S.C. 154(b) by 0 days. days.

(21) Appl. No.: 14/645,153

(22) Filed: Mar. 11, 2015

(65) Prior Publication Data

US 2016/0264798 A1 Sep. 15, 2016

(51) Int. Cl.
| | |
|---|---|
| B41F 7/00 | (2006.01) |
| C08K 3/00 | (2018.01) |
| C09D 11/037 | (2014.01) |
| C09D 11/101 | (2014.01) |

(52) U.S. Cl.
CPC .............. *B41F 7/00* (2013.01); *C08K 3/0033* (2013.01); *C09D 11/037* (2013.01); *C09D 11/101* (2013.01)

(58) Field of Classification Search
CPC ....... B41F 7/00; C09D 11/101; C09D 11/037; C08K 3/0033
See application file for complete search history.

(56) References Cited

U.S. PATENT DOCUMENTS

| | | | |
|---|---|---|---|
| 3,945,957 A | 3/1976 | Noshiro et al. | |
| 4,304,601 A | 12/1981 | Sharp | |
| 4,403,550 A | 9/1983 | Sharp | |
| 4,445,432 A * | 5/1984 | Ford, Jr. .................. | B41F 9/01 101/152 |
| 4,711,818 A | 12/1987 | Henry | |
| 4,806,391 A * | 2/1989 | Shorin ..................... | B41M 1/30 427/288 |
| 4,911,999 A | 3/1990 | Legere | |
| 4,927,180 A | 5/1990 | Trundle et al. | |
| 5,085,698 A | 2/1992 | Ma et al. | |
| 5,502,476 A | 3/1996 | Neal et al. | |
| 5,834,118 A | 11/1998 | Ranby et al. | |
| 5,886,067 A | 3/1999 | Li et al. | |
| 5,977,202 A | 11/1999 | Chawla et al. | |
| 6,114,489 A | 9/2000 | Vicari et al. | |
| 6,140,392 A | 10/2000 | Kingman et al. | |
| 6,239,189 B1 | 5/2001 | Narayan et al. | |
| 6,329,446 B1 | 12/2001 | Sacripante et al. | |
| 6,348,561 B1 | 2/2002 | Mychajlowskij et al. | |
| 6,664,015 B1 | 12/2003 | Sacripante | |
| 6,896,937 B2 | 5/2005 | Woudenberg | |
| 7,022,752 B2 | 4/2006 | Hayashi et al. | |
| 7,151,153 B2 | 12/2006 | Bruchmann et al. | |
| 7,202,006 B2 | 4/2007 | Chopra et al. | |
| 7,208,258 B2 | 4/2007 | Gervasi et al. | |
| 7,322,688 B2 | 1/2008 | Woudenberg | |
| 7,538,070 B2 | 5/2009 | Iftime et al. | |
| 7,556,844 B2 | 7/2009 | Iftime et al. | |
| 7,674,326 B2 | 3/2010 | Iftime et al. | |
| 7,708,396 B2 | 5/2010 | Iftime et al. | |
| 7,718,325 B2 | 5/2010 | Norsten et al. | |
| 7,723,398 B2 | 5/2010 | Ilg et al. | |
| 7,909,924 B2 | 3/2011 | Krishnan et al. | |
| 7,964,271 B2 | 6/2011 | Norsten et al. | |
| 8,001,889 B2 | 8/2011 | Gaugenrieder et al. | |
| 8,124,791 B2 | 2/2012 | Shinjo et al. | |
| 8,158,693 B2 | 4/2012 | Breton et al. | |
| 8,222,313 B2 | 7/2012 | Iftime et al. | |
| 8,771,787 B2 | 7/2014 | Breton et al. | |
| 8,895,400 B2 | 11/2014 | Seo et al. | |
| 8,934,823 B1 | 1/2015 | Pickering et al. | |
| 9,011,594 B1 | 4/2015 | Kanungo et al. | |
| 9,193,209 B2 | 11/2015 | Dooley et al. | |
| 9,283,795 B1 | 3/2016 | Kanungo et al. | |
| 9,359,512 B2 | 6/2016 | Moorlag et al. | |
| 9,387,661 B2 | 7/2016 | Zirilli | |
| 9,422,436 B2 | 8/2016 | Birau et al. | |
| 2002/0040073 A1 | 4/2002 | Stone et al. | |

(Continued)

FOREIGN PATENT DOCUMENTS

| | | |
|---|---|---|
| EP | 1235863 B1 | 1/2005 |
| JP | 03069954 A | 3/1991 |

(Continued)

OTHER PUBLICATIONS

Allen et al, "Acrylate Ink Compositions for Ink-Based Digital Lithographic Printing," U.S. Appl. No. 14/610,437, filed Jan. 30, 2015.
Birau et al., "White Ink Composition for Ink-Based Digital Printing," U.S. Appl. No. 14/619,820, filed Feb. 11, 2015.
Moorlag et al., "Hyperbranched Ink Compositions for Controlled Dimensional Change and Low Energy Curing," U.S. Appl. No. 14/620,945, filed Feb. 12, 2015.
Allen et al., "Acrylate Ink Compositions for Ink-Based Digital Lithographic Printing," U.S. Appl. No. 14/573,913, filed Dec. 17, 2014.

(Continued)

*Primary Examiner* — Alison L Hindenlang
*Assistant Examiner* — Michael Robinson
(74) *Attorney, Agent, or Firm* — MH2 Technology Law Group LLP

(57) ABSTRACT

Compatible acrylate ink sets include acrylate ink composition having 30% or less by weight pigment, 10% or less dispersant, between 40% and 80% acrylate, 12% or less photoinitiator, a viscosity between $5 \times 10^5$ and $3 \times 10^7$ cps at 35° C., and a 60 second tack between 25 and 50 g-m at 35° C.

18 Claims, 1 Drawing Sheet

(56) References Cited

U.S. PATENT DOCUMENTS

| | | |
|---|---|---|
| 2002/0107303 A1 | 8/2002 | Miyabashi et al. |
| 2003/0003323 A1 | 1/2003 | Murakami |
| 2003/0018100 A1 | 1/2003 | Foucher et al. |
| 2003/0021961 A1 | 1/2003 | Ylitalo et al. |
| 2003/0044691 A1 | 3/2003 | Setthachayanon et al. |
| 2003/0073762 A1 | 4/2003 | Jung et al. |
| 2003/0149130 A1 | 8/2003 | Kondo |
| 2003/0187098 A1 | 10/2003 | Chen et al. |
| 2004/0009363 A1 | 1/2004 | Shouldice et al. |
| 2004/0063809 A1 | 4/2004 | Fu et al. |
| 2004/0132862 A1 | 7/2004 | Woudenberg |
| 2004/0233465 A1 | 11/2004 | Coyle |
| 2005/0166783 A1 | 8/2005 | Ylitalo et al. |
| 2006/0054040 A1 | 3/2006 | Daems et al. |
| 2006/0110611 A1 | 5/2006 | Badesha et al. |
| 2007/0073762 A1 | 3/2007 | Adamson et al. |
| 2007/0166479 A1 | 7/2007 | Drake et al. |
| 2007/0257976 A1 | 11/2007 | Takabayashi |
| 2007/0259986 A1 | 11/2007 | Elwakil et al. |
| 2008/0090929 A1 | 4/2008 | Wilson et al. |
| 2008/0139743 A1 | 6/2008 | Krishnan et al. |
| 2008/0241485 A1 | 10/2008 | Shimohara et al. |
| 2008/0258345 A1 | 10/2008 | Bens et al. |
| 2008/0317957 A1 | 12/2008 | Overbeek et al. |
| 2009/0038506 A1 | 2/2009 | Odell et al. |
| 2009/0104373 A1 | 4/2009 | Vanbesien et al. |
| 2009/0110843 A1 | 4/2009 | Halahmi et al. |
| 2009/0135239 A1 | 5/2009 | Chretien et al. |
| 2009/0280302 A1 | 11/2009 | Fukumoto et al. |
| 2010/0016513 A1 | 1/2010 | Hartmann et al. |
| 2010/0020123 A1 | 1/2010 | Hirato |
| 2010/0067056 A1 | 3/2010 | Rich et al. |
| 2010/0214373 A1 | 8/2010 | Carr et al. |
| 2010/0239777 A1 | 9/2010 | Nakajima et al. |
| 2010/0304040 A1 | 12/2010 | Chretien et al. |
| 2011/0045199 A1 | 2/2011 | Cong |
| 2011/0141187 A1 | 6/2011 | Takabayashi |
| 2011/0188023 A1 | 8/2011 | Rondon et al. |
| 2011/0196058 A1 | 8/2011 | Breton et al. |
| 2011/0243629 A1 | 10/2011 | Roberts et al. |
| 2011/0262711 A1 | 10/2011 | Chopra et al. |
| 2012/0040156 A1 | 2/2012 | Ohashi et al. |
| 2012/0103212 A1 | 5/2012 | Stowe et al. |
| 2012/0103213 A1 | 5/2012 | Stowe et al. |
| 2012/0103218 A1 | 5/2012 | Stowe et al. |
| 2012/0103221 A1 | 5/2012 | Stowe et al. |
| 2012/0157561 A1 | 6/2012 | Gould et al. |
| 2012/0309896 A1 | 12/2012 | Carlini et al. |
| 2013/0050366 A1 | 2/2013 | Sasada et al. |
| 2013/0085208 A1 | 4/2013 | Norikoshi et al. |
| 2013/0104756 A1 | 5/2013 | Stowe et al. |
| 2013/0305946 A1* | 11/2013 | Iftime .................. C09D 11/50 101/483 |
| 2013/0305947 A1 | 11/2013 | Iftime et al. |
| 2013/0307913 A1 | 11/2013 | Kawashima et al. |
| 2013/0310479 A1 | 11/2013 | Lee et al. |
| 2013/0310517 A1 | 11/2013 | Lee et al. |
| 2013/0324653 A1 | 12/2013 | Bollard et al. |
| 2014/0235752 A1 | 8/2014 | Gharapetian et al. |
| 2014/0333704 A1 | 11/2014 | Takabayashi et al. |
| 2014/0340455 A1 | 11/2014 | Breton et al. |
| 2015/0077501 A1 | 3/2015 | Breton et al. |
| 2015/0093690 A1 | 4/2015 | Shimura et al. |
| 2015/0116416 A1 | 4/2015 | Belelie et al. |
| 2015/0170498 A1 | 6/2015 | Beggs et al. |
| 2015/0174887 A1 | 6/2015 | Moorlag et al. |
| 2015/0175820 A1 | 6/2015 | Breton et al. |
| 2015/0175821 A1 | 6/2015 | Moorlag et al. |
| 2016/0090490 A1 | 3/2016 | Moorlag et al. |
| 2016/0176185 A1 | 6/2016 | Kanungo et al. |
| 2016/0177113 A1 | 6/2016 | Allen et al. |
| 2016/0222231 A1 | 8/2016 | Allen et al. |
| 2016/0230027 A1 | 8/2016 | Birau et al. |
| 2016/0237290 A1 | 8/2016 | Moorlag et al. |
| 2016/0257829 A1 | 9/2016 | Breton et al. |
| 2016/0264798 A1 | 9/2016 | Allen et al. |
| 2016/0333205 A1 | 11/2016 | Lee et al. |

FOREIGN PATENT DOCUMENTS

| | | |
|---|---|---|
| JP | 2011208019 A | 10/2011 |
| WO | 2013119539 A1 | 8/2013 |

OTHER PUBLICATIONS

Breton et al., "Process Black Ink Compositions for Dali Architectures and Printing Processes," U.S. Appl. No. 14/635,679, filed Mar. 2, 2015.

Leach, et al., "The Printing Ink Manual, 5th Edition", Blue Print, New York, pp. 84-86, 516, 525, 544-550, 724-726 (1993).

Henri Bouas-Laurent, et al., Organic Photochromism (IUPAC Technical Report), Pure Appl. Chem., vol. 73, No. 4, pp. 639-665, 2001.

Communication dated May 4, 2015, issued in EP Appl. No. 14196839.6, pp. 1-5.

Thesis of Enrique Michel-Sanchez, Impact of Particle Morphology on the Rheology of PCC-Based Coatings, Aug. 2005.

Stowe, et al., "Methods for Rejuvenating an Imaging Member of an Ink-Based Digital Printing System", U.S. Appl. No. 15/240,691, filed Aug. 18, 2016.

Badesha, et al. "Fluorosilicone composite and Formulation Process for Imaging Plate", U.S. Appl. No. 15/222,364, filed Jul. 28, 2016.

Birau, et al. "Ink Composition and Method of Printing", U.S. Appl. No. 15/377,881, filed Dec. 13, 2016.

Allen, et al., "Acrylate Ink Compositions for Ink-Based Digital Lithographic Printing", U.S. Appl. No. 15/435,098, filed Feb. 16, 2017.

Breton, et al. "Aqueous Dispersible Polymer Inks", U.S. Appl. 15/442,260, filed Feb. 24, 2017.

* cited by examiner

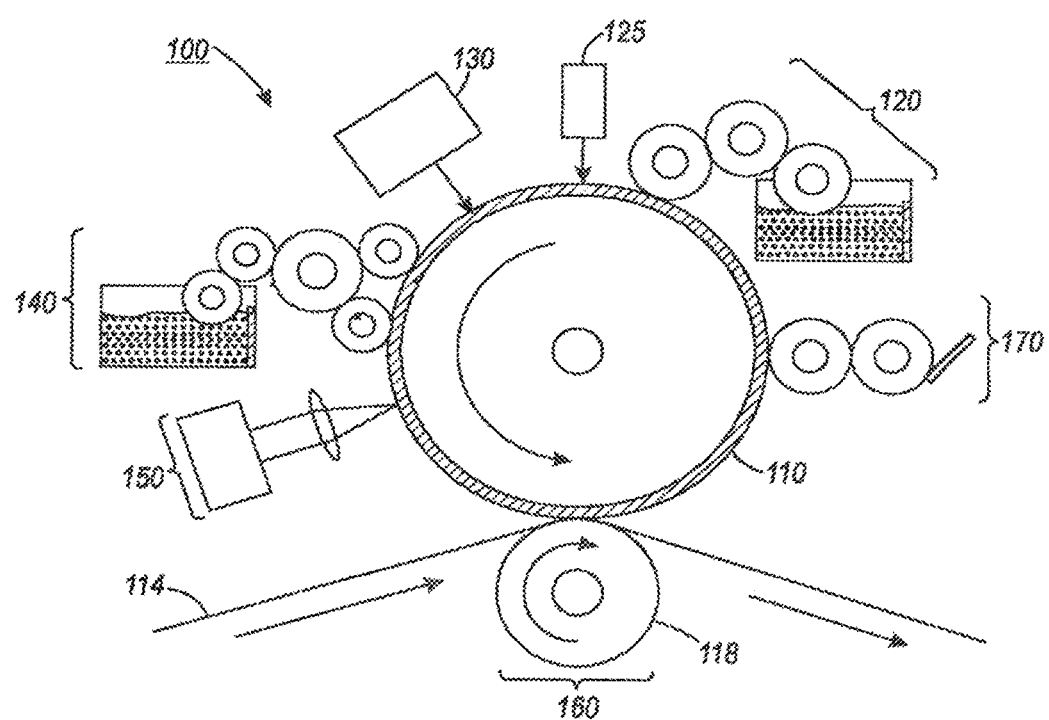
RELATED ART

ACRYLATE INK COMPOSITIONS FOR INK-BASED DIGITAL LITHOGRAPHIC PRINTING

FIELD OF DISCLOSURE

This disclosure relates to ink compositions for printing on substrates. In particular, the disclosure relates to acrylate ink compositions useful for digital lithographic printing systems.

BACKGROUND

In typical lithographic printing systems, a printing plate is formed to have "image regions" formed of a hydrophobic/oleophilic material and "non-image regions" formed of a hydrophilic/oleophobic material. The image regions correspond to the areas on the final print (i.e., the target substrate) that are occupied by ink, whereas the non-image regions correspond to the areas on the final print that are not occupied by said ink. The hydrophilic regions accept and are readily wetted by a water-based fluid, commonly referred to as a dampening fluid or fountain fluid (typically consisting of water and a small amount of alcohol as well as other additives and/or surfactants to reduce surface tension). The hydrophobic regions repel dampening fluid and accept ink, whereas the dampening fluid formed over the hydrophilic regions forms a fluid "release layer" for rejecting ink. The hydrophilic regions of the printing plate thus correspond to unprinted areas, or "non-image areas", of the final print.

The ink may be transferred directly to a target substrate, such as paper, or may be applied to an intermediate surface, such as an offset (or blanket) cylinder in an offset printing system.

Typical lithographic and offset printing techniques utilize plates which are permanently patterned, and are therefore useful only when printing a large number of copies of the same image (i.e. long print runs), such as magazines, newspapers, and the like. However, variable data digital lithography or digital offset lithography has been developed as a system which uses a non-patterned reimageable surface that is initially uniformly coated with a dampening fluid layer. Regions of the dampening fluid are removed by exposure to a focused radiation source (e.g., a laser light source) to form pockets. A temporary pattern in the dampening fluid is thereby formed over the non-patterned reimageable surface. Ink applied thereover is retained in the pockets formed by the removal of the dampening fluid. The inked surface is then brought into contact with a substrate, and the ink transfers from the pockets in the dampening fluid layer to the substrate. The dampening fluid may then be removed, a new uniform layer of dampening fluid applied to the reimageable surface, and the process repeated.

Digital offset lithography printing systems use offset-type inks that are specifically designed and optimized to be compatible with various subsystems, including ink delivery systems and a laser imaging systems, to enable high quality digital printing at high speed. Related art offset-type inks suffer shortfalls including, but not limited to, (1) being difficult to deliver via preferred inking systems, including anilox roller-type inking systems, (2) being soluble in commonly-employed dampening fluids, such as octamethylcyclotetrasiloxane (D4), (3) causing image background and/or ghosting issues, (4) being costly to manufacture and use, and (5) exhibiting inefficient image transfer. In addition, when designing multi-color or multi-ink printing systems, it is important that the ink forming an ink set not only be compatible with the components of the printing system, but also be compatible with the other inks of the ink set. These shortfalls, individually and in combination, tend to narrow a design space within which related art inks are usable in the context of digital offset lithography printing systems.

SUMMARY

Accordingly, there is a need to develop inks that exhibit improved qualities and that may address one or all of the above-identified shortfalls. Extensive experimentation has revealed that acrylate ink compositions according to embodiments of this disclosure may provide enhanced ease of delivery to an imaging member, such as a reimageable offset plate, enhanced transfer efficiency from the reimageable offset plate, and enhanced print quality on a variety of substrates. Further, these ink compositions do not tend to degrade printing system components, such as reimageable surfaces of imaging members, with which they contact. These acrylate ink compositions should meet various subsystem requirements imposed by ink-based digital printing systems that are configured for variable data lithographic printing. These requirements include wettability, releasability from a reimageable surface of an imaging member, and compatibility with non-aqueous dampening fluids configured for use with ink-based digital printing methods and systems.

Acrylate ink compositions are provided herein that meet the foregoing requirements. The disclosed acrylate ink compositions may be effectively delivered from an anilox roller-type delivery system to a reimageable surface of an imaging member during a variable data offset printing operation in which images on the reimageable surface are changeable between cycles of the imaging member. The disclosed acrylate ink compositions exhibit stable rheology that enables delivery using an anilox roll delivery system, and demonstrate desirable transferability to a reimageable surface of an imaging member.

The following presents a simplified summary in order to provide a basic understanding of some aspects of one or more embodiments of the present teachings. This summary is not an extensive overview, nor is it intended to identify key or critical elements of the present teachings, nor to delineate the scope of the disclosure. Rather, its primary purpose is merely to present one or more concepts in simplified form as a prelude to the detailed description presented later.

Additional goals and advantages will become more evident in the description of the figures, the detailed description of the disclosure, and the claims.

The foregoing and/or other aspects and utilities embodied in the present disclosure may be achieved by providing a set of compatible acrylate ink compositions, including a first acrylate ink composition, comprising a first pigment; and a second acrylate ink composition, comprising a second pigment; wherein each of the acrylate ink compositions includes 30% or less by weight pigment, based on a total weight of the acrylate ink composition, 10% or less by weight dispersant, based on the total weight of the acrylate ink composition, between 40% and 80% by weight acrylate, based on the total weight of the acrylate ink composition, and 12% or less by weight photoinitiator, based on the total weight of the acrylate ink composition, wherein a viscosity of each acrylate ink composition is between $5 \times 10^5$ and $3 \times 10^7$ cps at 35° C., and wherein a 60 second tack of each acrylate ink composition is between 25 and 50 g-m at 35° C.

In another embodiment, each of the acrylate ink compositions further includes 1.5% or less by weight stabilizer, based on the total weight of the ink composition; and 12% or less by weight rheology modifier, based on the total weight of the ink composition.

In another embodiment, each of the acrylate ink compositions includes between 10% and 20% pigment; between 2% and 10% dispersant; between 50% and 75% acrylate; 10% or less photoinitiator; 0.4% or less stabilizer; and between 1% and 5% rheology modifier, wherein a viscosity of each acrylate ink composition is between $8\times10^5$ and $2\times10^7$ cps at 35° C., and wherein a 60 second tack of each acrylate ink composition is between 35 and 45 g-m at 35° C.

In another embodiment, each of the acrylate ink compositions consists includes between 12% and 18% pigment; between 4% and 8% dispersant; between 60% and 70% acrylate; between 5% and 10% photoinitiator; between 0.1% and 0.3% stabilizer; and 3% or less rheology modifier, wherein a viscosity of each acrylate ink composition is between $1\times10^6$ and $1\times10^7$ cps at 35° C., and wherein a 60 second tack of each acrylate ink composition is about 40 g-m at 35° C.

In another embodiment, the acrylate includes at least one of an acrylate monomer, acrylate polymer, acrylate oligomer, a trifunctional acrylate monomer, a polyester acrylate, and mixtures thereof.

In another embodiment, the acrylate includes at least one of a polyester acrylate oligomer, a tetrafunctional polyester acrylate oligomer, a propoxylated trimethylolpropane triacrylate monomer, an ethoxylated trimethylolpropane triacrylate monomer, a higher functionality monomer, and mixtures thereof.

In another embodiment, the photoinitiator is a free-radical photoinitiator.

In another embodiment, the first pigment is one of a cyan pigment, a magenta pigment, and a yellow pigment.

In another embodiment, the second pigment is a black pigment.

In another embodiment, the set of ink compositions further includes a third acrylate ink composition, comprising a third pigment; and a fourth acrylate ink composition, comprising a fourth pigment, wherein the first pigment is a cyan pigment, the second pigment is a magenta pigment, the third pigment is a yellow pigment, and the fourth pigment is a black pigment, and wherein the first, second, third, and fourth acrylate ink compositions are co-miscible with each other.

The foregoing and/or other aspects and utilities embodied in the present disclosure may be achieved by providing a method of printing using a variable data digital lithographic printing device, including applying a plurality of acrylate ink compositions to a reimageable surface of an imaging member; and transferring the acrylate ink compositions from the reimageable surface to a substrate, wherein each acrylate ink composition includes 30% or less by weight pigment, based on a total weight of the acrylate ink composition, 10% or less by weight dispersant, based on the total weight of the acrylate ink composition, between 40% and 80% by weight acrylate, based on the total weight of the acrylate ink composition, and 12% or less by weight photoinitiator, based on the total weight of the acrylate ink composition, wherein a viscosity of each acrylate ink composition is between $5\times10^5$ and $3\times10^7$ cps at 35° C., and wherein a 60 second tack of each acrylate ink composition is between 25 and 50 g-m at 35° C.

In another embodiment, the acrylate ink compositions further include a stabilizer and a rheology modifier, and each acrylate ink composition includes between 10% and 20% pigment; between 2% and 10% dispersant; between 50% and 75% acrylate; 10% or less photoinitiator; 0.4% or less by weight stabilizer, based on the total weight of the ink composition; and between 1% and 5% by weight rheology modifier, based on the total weight of the ink composition; wherein a viscosity of each acrylate ink composition is between $8\times10^5$ and $2\times10^7$ cps at 35° C., and wherein a 60 second tack of each acrylate ink composition is between 35 and 45 g-m at 35° C.

In another embodiment, each acrylate ink composition includes between 12% and 18% pigment; between 4% and 8% dispersant; between 60% and 70% acrylate; between 5% and 10% photoinitiator; between 0.1% and 0.3% stabilizer; and 3% or less rheology modifier, wherein a viscosity of each acrylate ink composition is between $1\times10^6$ and $1\times10^7$ cps at 35° C., and wherein a 60 second tack of each acrylate ink composition is about 40 g-m at 35° C.

In another embodiment, the acrylate includes at least one of an acrylate monomer, acrylate polymer, acrylate oligomer, a trifunctional acrylate monomer, a polyester acrylate, and mixtures thereof.

In another embodiment, the acrylate includes at least one of a polyester acrylate oligomer, a tetrafunctional polyester acrylate oligomer, a propoxylated trimethylolpropane triacrylate monomer, an ethoxylated trimethylolpropane triacrylate monomer, a higher functionality monomer, and mixtures thereof.

In another embodiment, the photoinitiator is a free-radical photoinitiator.

BRIEF DESCRIPTION OF THE DRAWINGS

These and/or other aspects and advantages in the embodiments of the disclosure will become apparent and more readily appreciated from the following description of the various embodiments, taken in conjunction with the accompanying drawings of which:

FIG. 1 illustrates a variable image digital printing system.

It should be noted that some details of the drawings have been simplified and are drawn to facilitate understanding of the present teachings rather than to maintain strict structural accuracy, detail, and scale.

The drawings above are not necessarily to scale, with emphasis instead generally being placed upon illustrating the principles in the present disclosure. Further, some features may be exaggerated to show details of particular components. These drawings/figures are intended to be explanatory and not restrictive.

DETAILED DESCRIPTION

Reference will now be made in detail to the various embodiments in the present disclosure. The embodiments are described below to provide a more complete understanding of the components, processes and apparatuses disclosed herein. Any examples given are intended to be illustrative, and not restrictive. Throughout the specification and claims, the following terms take the meanings explicitly associated herein, unless the context clearly dictates otherwise. The phrases "in some embodiments" and "in an embodiment" as used herein do not necessarily refer to the same embodiment(s), though they may. Furthermore, the phrases "in another embodiment" and "in some other embodiments" as used herein do not necessarily refer to a different embodiment, although they may. As described below, various embodiments may be readily combined, without departing from the scope or spirit of the present disclosure.

As used herein, the term "or" is an inclusive operator, and is equivalent to the term "and/or," unless the context clearly dictates otherwise. The term "based on" is not exclusive and allows for being based on additional factors not described, unless the context clearly dictates otherwise. In the specification, the recitation of "at least one of A, B, and C," includes embodiments containing A, B, or C, multiple examples of A, B, or C, or combinations of NB, A/C, B/C, A/B/B/B/B/C, A/B/C, etc. In addition, throughout the specification, the meaning of "a," "an," and "the" include plural references. The meaning of "in" includes "in" and "on."

All physical properties that are defined hereinafter are measured at 20° to 25° Celsius unless otherwise specified. The term "room temperature" refers to 25° Celsius unless otherwise specified.

When referring to any numerical range of values herein, such ranges are understood to include each and every number and/or fraction between the stated range minimum and maximum. For example, a range of 0.5-6% would expressly include all intermediate values of 0.6%, 0.7%, and 0.9%, all the way up to and including 5.95%, 5.97%, and 5.99%. The same applies to each other numerical property and/or elemental range set forth herein, unless the context clearly dictates otherwise.

The present disclosure has been described with reference to exemplary embodiments. Although a few embodiments have been shown and described, it will be appreciated by those skilled in the art that changes may be made in these embodiments without departing from the principles and spirit of preceding detailed description. It is intended that the present disclosure be construed as including all such modifications and alterations insofar as they come within the scope of the appended claims or the equivalents thereof. For example, while the embodiments below are described in view of the printing system illustrated in FIG. 1, it should be understood that embodiments of the acrylate ink compositions described herein may also be used with other compatible printing systems.

Ink compositions in accordance with embodiments recited herein are suitable for ink-based digital printing. "Variable data lithography printing," or "ink-based digital printing," or "digital offset printing," as these terms may be used throughout this disclosure, refer to lithographic printing of variable image data for producing images on a substrate that are changeable with each subsequent rendering of an image on the substrate in an image forming process. "Variable data lithographic printing" includes offset printing of ink images using lithographic ink where the images are based on digital image data that may vary from image to image. Ink-based digital printing uses a variable data lithography printing system or digital offset printing system. A "variable data lithography system" is a system that is configured for lithographic printing using lithographic inks and based on digital image data, which may vary from one image to the next.

By way of example, an ink-based digital printing system with anilox roll ink delivery subsystem that may be used with embodiments of the acrylate ink compositions herein is described in U.S. patent application Ser. No. 13/095,714. U.S. patent application Ser. No. 13/095,714 ("714 application"), titled "Variable Data Lithography System," filed on Apr. 27, 2011, by Timothy Stowe et al., which is commonly assigned, and the disclosure of which is hereby incorporated by reference herein in its entirety, describes an exemplary variable data lithography system 100 for ink-based digital printing in FIG. 1.

A general description of the exemplary printing system 100 shown in FIG. 1 is provided below. Additional details regarding individual components and/or subsystems shown in the exemplary system 100 of FIG. 1 may be found in the 714 application.

FIG. 1 illustrates a variable image digital printing system. As illustrated in FIG. 1, a printing system 100 may include an imaging member 110. While the imaging member 110 is illustrated in FIG. 1 as a drum, in other embodiments, the imaging member 110 could also be embodied as a plate, belt, or another now known or later developed configuration. The imaging member 110 includes a reimageable surface that may be formed of materials including, for example, a class of materials commonly referred to as silicones, including polydimethylsiloxane (PDMS), among others. For example, silicone, fluorosilicone, and/or fluoroelastomer may be used to form the reimageable surface of the imaging member 110. The reimageable surface may be formed of a relatively thin layer over a mounting layer, a thickness of the relatively thin layer being selected to balance printing or marking performance, durability, and manufacturability.

In some embodiments, the imaging member 110 is used to apply an inked image to an image receiving media substrate 114 at a transfer nip 112. The transfer nip 112 may be formed by an impression roller 118, as part of an image transfer mechanism 160, exerting pressure in the direction of the imaging member 110. Image receiving medium substrate 114 should not be considered to be limited to any particular composition, such as; for example, paper, plastic, or composite sheet film. The exemplary printing system 100 may be used for producing images on a wide variety of image receiving media substrates 114. The 714 application also explains the wide latitude of marking (printing) materials that may be used, including marking materials with pigment densities greater than 10% by weight. As does the 714 application, this disclosure will use the term ink to refer to a broad range of printing or marking materials to include those which are commonly understood to be inks, pigments, and other materials which may be applied by the exemplary system 100 to produce an output image on the image receiving media substrate 114.

The 714 application depicts and describes details of the imaging member 110 including the imaging member 110 being comprised of a reimageable surface layer formed over a structural mounting layer that may be, for example, a cylindrical core, or one or more structural layers over a cylindrical core.

The exemplary printing system 100 may include a dampening fluid system 120 generally comprising a series of rollers, which may be considered as dampening rollers or collectively as a dampening unit, for uniformly wetting the reimageable surface of the imaging member 110 with dampening fluid. One purpose of the dampening fluid system 120 is to deliver a layer of dampening fluid, generally having a uniform and controlled thickness, to the reimageable surface of the imaging member 110. A dampening fluid such as fountain solution may comprise mainly water optionally with small amounts of isopropyl alcohol or ethanol added to reduce surface tension as well as to lower evaporation energy necessary to support subsequent laser patterning, as will be described in greater detail below. Small amounts of certain surfactants may be added to the fountain solution as well. Alternatively, other suitable dampening fluids may be used to enhance the performance of ink based digital lithography systems. Extensive experimentation has found that a preferred dampening fluid may be D4 (octamethylcyclotetrasiloxane). Other suitable dampening fluids are disclosed, by way of example, in U.S. patent application Ser. No. 13/284,114, filed on Oct. 28, 2011, titled "Dampening Fluid for Digital Lithographic Printing," the disclosure of which is hereby incorporated herein by reference in its entirety.

Once the dampening fluid is metered onto the reimageable surface of the imaging member 110 by the dampening fluid system 120, a thickness of the dampening fluid may be measured using a sensor 125 that may provide feedback to control the metering of the dampening fluid onto the reimageable surface of the imaging member 110 by the dampening fluid system 120.

After an amount of dampening fluid is provided by the dampening fluid system 120 on the reimageable surface of the imaging member 110, an optical patterning subsystem 130 may be used to selectively form a latent image in the uniform dampening fluid layer by image-wise patterning the dampening fluid layer using, for example, laser energy. Typically, the dampening fluid will not absorb the optical energy (IR or visible) efficiently. The reimageable surface of the imaging member 110 should ideally absorb most of the laser energy (visible or invisible such as IR) emitted from the optical patterning subsystem 130 close to the surface to minimize energy wasted in heating the dampening fluid and to minimize lateral spreading of heat in order to maintain a high spatial resolution capability. Alternatively, an appropriate radiation sensitive component may be added to the dampening fluid to aid in the absorption of the incident radiant laser energy. While the optical patterning subsystem 130 is described above as being a laser emitter, it should be understood that a variety of different systems may be used to deliver the optical energy to pattern the dampening fluid.

The mechanics at work in the patterning process undertaken by the optical patterning subsystem 130 of the exemplary system 100 are described in detail with reference to FIG. 5 in the 714 application. Briefly, the application of optical patterning energy from the optical patterning subsystem 130 results in selective removal of portions of the layer of dampening fluid.

Following patterning of the dampening fluid layer by the optical patterning subsystem 130, the patterned layer over the reimageable surface of the imaging member 110 is presented to an inker subsystem 140. The inker subsystem 140 is used to apply a uniform layer of ink over the layer of dampening fluid and the reimageable surface layer of the imaging member 110. The inker subsystem 140 may use an anilox roller to meter an offset lithographic ink onto one or more ink forming rollers that are in contact with the reimageable surface layer of the imaging member 110. Separately, the inker subsystem 140 may include other traditional elements such as a series of metering rollers to provide a precise feed rate of ink to the reimageable surface of the imaging member 110. The inker subsystem 140 may deposit the ink to the pockets representing the imaged portions of the reimageable surface, while ink on the unformatted portions of the dampening fluid will not adhere to those portions.

The cohesiveness and viscosity of the ink residing in the reimageable layer of the imaging member 110 may be modified by a number of mechanisms. One such mechanism may involve the use of a pre-cure or rheology (complex viscoelastic modulus) control subsystem 150. The rheology control system 150 may form a partial crosslinking core of the ink on the reimageable surface to, for example, increase ink cohesive strength relative to the reimageable surface layer. Curing mechanisms may include optical or photo curing, heat curing, drying, or various forms of chemical curing.

The ink is transferred from the reimageable surface of the imaging member 110 to a substrate of image receiving medium 114 using a transfer subsystem 160. The transfer occurs as the image receiving media substrate 114 is passed through a nip 112 between the imaging member 110 and an impression roller 118 such that the ink within the voids of the reimageable surface of the imaging member 110 is brought into physical contact with the image receiving media substrate 114. With the adhesion of the ink having been modified by the rheology control system 150, adhesion of the ink may cause the ink to adhere to the image receiving media substrate 114 and to separate from the reimageable surface of the imaging member 110. Careful control of the rheology of the ink through composition or other means, as well as temperature and pressure conditions at the transfer nip 112, may allow, or otherwise facilitate, transfer efficiencies for the ink from the reimageable surface of the imaging member 110 to the image receiving media substrate 114 to exceed 95%. While it is possible that in some embodiments some dampening fluid may also wet the image receiving media substrate 114, the volume of such a dampening fluid will be minimal, and will rapidly evaporate or be absorbed by the image receiving media substrate 114.

In certain offset lithographic systems, it should be recognized that an offset roller, not shown in FIG. 1, may first receive the inked image pattern and then transfer the inked image pattern to a substrate according to a known indirect transfer method.

Following the transfer of a high percentage of the ink to the image receiving media substrate 114, residual ink and/or residual dampening fluid should be removed from the reimageable surface of the imaging member 110, preferably without scraping or wearing the reimageable surface. For example, an air knife may be employed to remove residual dampening fluid and/or ink. It is anticipated, however, that some amount of ink residue may remain on the reimageable surface. Removal of such remaining ink residue may be accomplished through use of some form of cleaning subsystem 170. The 714 application describes details of such a cleaning subsystem 170 including at least a first cleaning member such as a sticky or tacky member in physical contact with the reimageable surface of the imaging member 110, the sticky or tacky member removing residual ink and any remaining small amounts of surfactant compounds from the reimageable surface of the imaging member 110. The sticky or tacky member may then be brought into contact with a smooth roller to which residual ink may be transferred from the sticky or tacky member, the ink being subsequently stripped from the smooth roller by, for example, a doctor blade.

The 714 application details other mechanisms by which cleaning of the reimageable surface of the imaging member 110 may be facilitated. Regardless of the cleaning mechanism, however, in some embodiments cleaning of the residual ink and dampening fluid from the reimageable surface of the imaging member 110 is needed to preventing ghosting in the proposed system. Once cleaned, the reimageable surface of the imaging member 110 is again presented to the dampening fluid system 120 by which a fresh layer of dampening fluid is supplied to the reimageable surface of the imaging member 110, and the process is repeated.

The imaging member reimageable surface may preferably be formed of a polymeric elastomer, such as silicone rubber and/or fluorosilicone rubber. The term "silicone" is well understood to those of skill in the relevant art and refers to polyorganosiloxanes having a backbone formed from silicon and oxygen atoms and sidechains containing carbon and hydrogen atoms. For the purposes of this application, the term "silicone" should also be understood to exclude siloxanes that contain fluorine atoms, while the term "fluorosilicone" is used to cover the class of siloxanes that contain fluorine atoms. Other atoms may be present in the silicone rubber, for example nitrogen atoms in amine groups which are used to link siloxane chains together during crosslinking. The side chains of the polyorganosiloxane can also be alkyl or aryl.

As discussed above, inks that are useful for ink-based digital offset printing must possess physical and chemical properties that meet the specific demands of ink-based digital printing systems such as the system shown in FIG. 1. The digital offset ink must be compatible with materials with which it is intended to come in contact, including the imaging plate (reimageable surface of the imaging member) and various dampening fluids, as well as printable substrates such as paper, metal, or plastic. The digital offset ink must also meet all functional requirements of the subsystems as imposed by wetting and transfer properties defined by subsystem architecture and materials sets. In addition, in some embodiments, each ink in an ink set must be compatible with the other inks of the ink set. Compatibility may be defined by preferred co-miscibility and co-dispersability ranges for the inks within an ink set determined in part by the selection of pigments and/or ink base used, as well as polarity matching of the ink base components. For example, to minimize phase separation interactions among the pigments and the pigmented inks during transfer of the inks to the image receiving media substrate 114, developing inks, such as cyan, magenta, yellow and black inks, in direct proximity with each other, are configured to be co-miscible and compatible with each other so as to not phase separate with each other. Similarly, the co-miscibility and compatibility properties of the inks in an ink set further allow residual inks on the reimageable surface of the imaging member 110 to be removed with efficiency by the cleaning subsystem 170.

In some embodiments, inks formulated for ink-based digital printing, or digital offset inks, are different in many ways from inks developed for other printing applications, including pigmented solvent inks, offset inks, flexography inks, UV gel inks, and the like. For example, digital offset inks contain much higher pigment loading leading to higher viscosities at room temperature than other inks, which can make ink delivery by way of an anilox roller system difficult. In some embodiments, digital offset inks should not cause the imaging member (reimageable) surface, which may be a silicone, fluorosilicone, or VITON-containing imaging plate or blanket, to swell and should be compatible with dampening fluid options.

Acrylate ink composition according to the embodiments disclosed herein have been found to minimize a solubility of the acrylate ink compositions in dampening fluid, such as D4, and to minimize or prevent swelling of a fluorosilicone-containing imaging member. Acrylate ink compositions in accordance with embodiments preferably exhibit a rheology that is suitable for anilox roller delivery. In addition, some embodiments of the acrylate ink compositions are compatible with non-aqueous dampening fluids and exhibit desirable releasability from the imaging member (reimageable) surface after ink image formation.

According to some embodiments of the present invention, the acrylate ink composition is part of an ink set of acrylate ink compositions. In one embodiment, the acrylate ink compositions within the ink set are compatible with each other. In some embodiments, each acrylate ink composition includes a pigment, an acrylate, a dispersant, and a photo initiator. In one embodiment, each acrylate ink composition also includes at least one of rheology modifiers, stabilizers, and other ink composition additives.

For example, in one embodiment, the acrylate ink compositions may include pigments such as HELIOGEN Blue D 7088 available from BASF; Permanent Rubine L5B 01 (PR57:1), Permanent Yellow G-MX (PY 14), DHG-CN09 (PY 12), or HOSTAPERM Blue B4G, available from Clariant Corporation. Other suitable pigments include black pigments, white pigments, cyan pigments, magenta pigments, yellow pigments, and the like. Further, pigments may be organic or inorganic particles. Suitable inorganic pigments may include carbon black. However, other inorganic pigments may be suitable such as titanium oxide, and iron oxide. Suitable organic pigments include, for example, azo pigments including diazo pigments and monoazo pigments, polycyclic pigments (e.g., phthalocyanine pigments such as phthalocyanine blues and phthalocyanine greens), perylene pigments, perinone pigments, anthraquinone pigments, quinacridone pigments, dioxazine pigments, thioindigo pigments, isoindolinone pigments, pyranthrone pigments, and quinophthalone pigments), insoluble dye chelates (e.g., basic dye type chelates and acidic dye type chelate), nitro pigments, nitroso pigments, anthanthrone pigments such as PR168, and the like.

Representative examples of phthalocyanine blues and greens include copper phthalocyanine blue, copper phthalocyanine green, and derivatives thereof (Pigment Blue 15, Pigment Green 7, and Pigment Green 36). Representative examples of quinacridones include Pigment Orange 48, Pigment Orange 49, Pigment Red 122, Pigment Red 192, Pigment Red 202, Pigment Red 206, Pigment Red 207, Pigment Red 209, Pigment Violet 19, and Pigment Violet 42. Representative examples of anthraquinones include Pigment Red 43, Pigment Red 194, Pigment Red 177, Pigment Red 216 and Pigment Red 226. Representative examples of perylenes include Pigment Red 123, Pigment Red 149, Pigment Red 179, Pigment Red 190, Pigment Red 189 and Pigment Red 224. Representative examples of thioindigoids include Pigment Red 86, Pigment Red 87, Pigment Red 88, Pigment Red 181, Pigment Red 198, Pigment Violet 36, and Pigment Violet 38. Representative examples of heterocyclic yellows include Pigment Yellow 1, Pigment Yellow 3, Pigment Yellow 12, Pigment Yellow 13, Pigment Yellow 14, Pigment Yellow 17, Pigment Yellow 65, Pigment Yellow 73, Pigment Yellow 74, Pigment Yellow 90, Pigment Yellow 110, Pigment Yellow 117, Pigment Yellow 120, Pigment Yellow 128, Pigment Yellow 138, Pigment Yellow 150, Pigment Yellow 151, Pigment Yellow 155, Pigment Yellow 180 and Pigment Yellow 213. Such pigments are commercially available in either powder or press cake form from a number of sources including, BASF Corporation, Engelhard Corporation, and Sun Chemical Corporation.

Examples of black pigments that may be used include carbon pigments. The carbon pigments may be almost any commercially available carbon pigment that provides acceptable optical density and print characteristics. Carbon pigments suitable for use in systems and methods in accordance with embodiments may include, without limitation, carbon black, graphite, vitreous carbon, charcoal, and combinations thereof. Such carbon pigments can be manufactured by a variety of known methods, such as a channel method, a contact method, a furnace method, an acetylene method, or a thermal method, and are commercially available from such vendors as Cabot Corporation, Columbian Chemicals Company, Evonik, Orion Engineered Carbons, and E.I. DuPont de Nemours and Company. Suitable carbon black pigments include, without limitation, Nipex 150 or Nipex 35 (available from Orion Engineered Carbons), Cabot pigments such as MONARCH 1400, MONARCH 1300, MONARCH 1100, MONARCH 1000, MONARCH 900, MONARCH 880, MONARCH 800, MONARCH 700, CAB-O-JET 200, CAB-O-JET 300, REGAL, BLACK PEARLS, ELFTEX, MOGUL E, MOGUL L, and VULCAN pigments; Columbian pigments such as RAVEN 5000, and RAVEN 3500; Evonik pigments such as Color Black FW 200, FW 2, FW 2V, FW 1, FW18, FW S160, FW S170, Special Black 6, Special Black 5, Special Black 4A, Special Black 4, PRINTEX U, PRINTEX 140U, PRINTEX V, and PRINTEX 140V. The above list of pigments includes unmodified pigment particulates, small molecule attached pigment particulates, and polymer-dispersed pigment particulates. Other pigments can also be selected, as well as mixtures thereof. In some embodiments, the pigment particle size is desired to be as small as possible to enable a stable colloidal suspension of the particles in the liquid vehicle, for example.

In one embodiment, the acrylate ink composition includes 30% or less pigment by weight, based on a total weight of the acrylate ink composition. In another embodiment, the acrylate ink composition includes 20% or less pigment. In another example, the acrylate ink composition includes between 10% and 20% pigment. In yet another example, the acrylate ink composition includes between 12% and 18% pigment. In another example, the acrylate ink composition includes 15% or 17.5% pigment.

In some embodiments, the acrylate ink compositions may include an acrylate. Acrylates or propenoates are salts and esters of acrylic acid. Acrylate and methacrylate monomers are understood to contain reactive vinyl functional groups that facilitate formation of acrylate polymers. Exemplary acrylates may include acrylate monomers, oligomers, or polymers, such as, difunctional monomers, for example, Sartomer SR247, Sartomer CD595 and Sartomer SR9003, trifunctional monomers, for example, Sartomer SR492, Sartomer SR9020, Sartomer SR501, Sartomer SR454 and Sartomer SR9035, and polyester acrylates, for example, Sartomer CN294E, Sartomer CN2282, Sartomer CN2295, Sartomer CN2264, Sartomer CN2256, and from Allnex, EBECRYL 450, EBECRYL 657 and EBECRYL 809. In one embodiment, the acrylate ink composition includes at least one of a polyester acrylate oligomer, such as a tetrafunctional polyester acrylate oligomer; a propoxylated trimethylolpropane triacrylate monomer; ethoxylated trimethylolpropane triacrylate monomer, and mixtures thereof. In one embodiment, the acrylate ink composition includes compatible higher functionality monomers (n-4, 5, 6, etc.).

In one embodiment, the acrylate ink composition includes between 40% and 80% acrylate by weight, based on a total weight of the acrylate ink composition. In another embodiment, the acrylate ink composition includes between 50% and 75% by weight acrylate. In yet another example, the acrylate ink composition includes between 60% and 70% by weight acrylate. In one example, the acrylate ink composition includes between 65% and 70% acrylate.

In some embodiments, the acrylate ink compositions may include a dispersant. The dispersants may include polymeric dispersants, such as those from Lubrizol including SOL-SPERSE 32000, SOLSPERSE 39000, SOLSPERSE 71000, SOLSPERSE J-100, SOLSPERSE J-180, SOLSPERSE J-200, SOLSPERSE X300, and from BASF, such as EFKA 4300, EFKA 4330, EFKA 4340, EFKA 4400, EFKA PX 4701, EFKA 4585, EFKA 5207, EFKA 6230, EFKA 7701, EFKA 7731, and from Tego, such as TEGO Dispers 656, TEGO Dispers 685, TEGO Dispers 710, and from King Industries, such as K-SPERSE A-504.

In one embodiment, the acrylate ink composition includes 10% or less dispersant by weight, based on a total weight of the acrylate ink composition. In another example, the acrylate ink composition includes between 2% and 10% dispersant. In yet another example, the acrylate ink composition includes between 4% and 8% dispersant.

In some embodiments, the acrylate ink compositions may include rheology modifiers. Exemplary rheology modifiers may be modified or unmodified inorganic compounds including organoclays, attapulgite clays and bentonite clays, including tetraalkyl ammonium bentonites as well as treated and untreated synthetic silicas. Suitable organoclays include from Southern Clay Products CLAYTONE HA and CLAYTONE HY. Suitable examples of tetraalkyl ammonium bentonites include from Celeritas Chemicals CELCHEM 31743-09, CELCHEM 31744-09, and CELCHEM 31745-09. Other exemplary rheology modifiers include organic compounds such as EFKA RM1900 and EFKA RM1920, both modified hydrogenated castor oils from BASF.

In one embodiment, the acrylate ink composition includes 12% or less rheology modifiers by weight, based on a total weight of the acrylate ink composition. In another example, the acrylate ink composition includes between 1% and 5% rheology modifiers. In yet another example, the acrylate ink composition includes 3% or less rheology modifiers. In one embodiment, the acrylate ink composition includes 2% rheology modifiers.

In some embodiments, the acrylate ink compositions may include photoinitiators. Photoinitiators may be liquid- or solid-based or combinations thereof. Suitable Type I photoinitiators include those from classes of dialkoxy-acetopheonones, dialkoxy-alkyl-pheonones, amino-alkyl-pheonones, and acyl-phosphine oxides. Suitable Type II photoinitiators include those from classes of benzophenones and thioxanthones, which require activation from suitable amine synergists. Exemplary photoinitiators include ADDITOL LX, ADDITOL DX, ADDITOL BDK, ADDITOL CPK, ADDITOL DMMTA, ADDITOL TPO from Allnex, Esacure 1001M from IRGACURE 127, IRGACURE 184, IRGACURE 379, IRGACURE 819 and IRGACURE 2959 from BASF. Exemplary amine synergists that are used with Type II photoinitiators include SPEEDCURE PDA, SPEEDCURE EDB from Lambson, Diethylaminoethyl Methacrylate, Ethyl-4-dimethylamino benzoate, 2-Ethylhexyl 4-dimethylamino benzoate from Esstech, Inc. In some embodiment, the acrylate ink composition may include low odor photoinitiators, such as, ESACURE KIP 150 available from Lamberti S.p.A. In other embodiments, the acrylate ink composition may include free radical photoinitiators in single or mixed systems.

In one embodiment, the acrylate ink composition includes 12% or less photoinitiators by weight, based on a total weight of the acrylate ink composition. In another example, the acrylate ink composition includes 10% or less photoinitiators. In yet another example, the acrylate ink composition includes between 5% and 10% photoinitiators. In one embodiment, the acrylate ink composition includes between 6% and 8% by weight photoinitiators.

In some embodiments, the acrylate ink compositions may include stabilizer polymerization inhibitors or stabilizers. For example, the stabilizers may include Sartomer USA CN3216 (an active component proprietary stabilizer with p-methoxyphenol in a proprietary acrylate monomer and a proprietary acrylate oligomer), BASF IRGASTAB UV22 (a hindered phenol), and GENORAD 16 and GENORAD 18, both from Rahn USA Corporation.

In one embodiment, the acrylate ink composition includes 1.5% or less active component stabilizers by weight, based on a total weight of the acrylate ink composition. In another example, the acrylate ink composition includes 0.4% or less stabilizers. In another example, the acrylate ink composition includes between 0.1% and 0.3% stabilizers. In one embodiment, the acrylate ink composition includes 0.2% stabilizers.

Acrylate ink compositions in accordance with the embodiments described herein may be formed by preparing an ink base and mixing it with one or more of the components recited above.

Aspects of the present disclosure may be further understood by referring to the following examples. The examples are illustrative, and are not intended to be limiting embodiments thereof. The examples below illustrate embodiments of acrylate ink compositions using cyan, magenta, yellow, and black pigments.

Example C1

Based on a total 400 gram scale of preparation for a cyan ink composition, 4.5% wt. of SOLSPERSE 39000, 50.53% wt. of CN294E, 9.1% of CN2256, 11.65% of SR-9035, and 11% wt. of CN3216 were added to a 1 liter stainless steel vessel and placed on a heating mantle (available from IKA®) together with a thermocouple and stirrer apparatus (also available from IKA®) and equipped with an anchor impeller. The components in the vessel (dispersant, acrylates, and stabilizer) were then stirred at 200 RPM for 30 minutes at 80° C. Thereafter photoinitiators (2% wt. Irgacure 379, 1.39% wt. Irgacure 819, and 3.62% wt. Esacure Kip 150) were added slowly to the vessel and stirred at about 80° C. for another hour. With the components in the vessel solubilized, 15% wt. of Heliogen Blue D 7088 pigment was added to the vessel and stirred more vigorously but not the point where air was entrained into the mixture. The pigmented mixture was allowed to stir for about 30 minutes at about 400 RPM at which point 2% wt. Claytone HY was added slowly to the pigmented mixture at a reduced RPM and then re-stirred for about another 15 minutes at about 400 RPM. The vessel containing the mixed components was transferred to a high speed shearing mill available from the Hockmeyer Equipment Corporation equipped with a 40 mm diameter high shear Cowles blade which was then stirred at 5300 RPM for about an hour. The thoroughly mixed component mixture was then qualitatively transferred to a 3-roll mill apparatus manufactured by Kent Machine Works where the material composite paste was passed through the 3-roll mill first at an input apron roll speed of 400 RPM for the first pass and then at an input apron roll speed of 200 RPM for the second pass. The vessel containing the mixed components was then transferred to a high speed shearing mill (available from the Hockmeyer Equipment Corporation) equipped with a 40 mm diameter high shear Cowles blade and stirred at 5300 RPM for about an hour. The thoroughly mixed component mixture was then qualitatively transferred to a 3-roll mill apparatus (manufactured by Kent Machine Works) where it was passed through the 3-roll mill first at an input apron roll speed of 400 RPM for a first pass and then at an input apron roll speed of 200 RPM for a second pass to form Example C1 cyan acrylate ink composition. The component percentages of Example C1 are summarized in Table 1 below.

Examples C2, C3, C4, and C5

Additional examples of cyan acrylate ink compositions were prepared in the same manner as Example C1 using cyan pigments and the components percentages detailed in Table 1.

TABLE 1

Formulation of Example Inks C1, C2, C3, C4, and C5

Ink Composition Formulation

| | Component | Available from | C1 | C2 | C3 | C4 | C5 |
|---|---|---|---|---|---|---|---|
| Pigment | HELIGOEN Blue D 7088 | BASF | 15 | 15 | 17.5 | — | — |
| | HOSTAPERM Blue B4G | Clariant Corp. | — | — | — | 15 | 17.5 |
| Dispersant | Solsperse 39000 | Lubrizol Corp. | 4.5 | 4.5 | 5.25 | 4.5 | 7 |
| Oligomer | CN294E | Sartomer Co. | 50.53 | 65 | 62 | 65 | 61.73 |
| | CN2256 | Sartomer Co. | 9.1 | — | — | — | — |
| Monomer | SR-501 | Sartomer Co. | — | 5.49 | — | 5.49 | 1.76 |
| | SR-9035 | Sartomer Co. | 11.65 | — | 5.24 | — | — |
| Photoinitiator | Irgacure 379 | BASF | 2 | 2 | 2 | 2 | 2 |
| | Irgacure 819 | BASF | 1.39 | 1.39 | 1.39 | 1.39 | 1.39 |
| | Esacure KIP 150 | Lamberti Technologies | 3.62 | 3.62 | 3.62 | 3.62 | 3.62 |
| Stabilizer | CN3216 | Sartomer Co. | — | 1 | 1 | 1 | 1 |
| | IRGASTAB UV-10 | BASF | 0.2 | — | — | — | — |
| Rheology Modifier | Claytone HY | Southern Clay Products | 2 | 2 | 2 | 2 | 4 |
| | Total Weight Percentage | | 100 | 100 | 100 | 100 | 100 |

As illustrated in Table 1, different cyan acrylate ink compositions were obtained. These acrylate ink compositions had favorable pigment wetting and dispersion characteristics, and remained stable over many months without showing signs of syneresis.

Examples M1, M2, M3

Magenta acrylate ink compositions were prepared in the same manner as Example C1 using magenta pigments and the components percentages detailed in Table 2.

TABLE 2

Formulation of Example Inks M1, M2, and M3

| Component | | Available from | Ink Composition Formulation | | |
|---|---|---|---|---|---|
| | | | M1 | M2 | M3 |
| Pigment | Permanent Rubine L5B 01 (PR57:1) | Clariant Corp. | 15 | 15 | 15 |
| Dispersant | Solsperse 39000 | Lubrizol Corp. | 6 | — | — |
| | Solperse J-180 | Lubrizol Corp. | — | 6 | 4.5 |
| Oligomer | CN294E | Sartomer Co. | 55.72 | 48.91 | 65 |
| | CN2256 | Sartomer Co. | — | 8.81 | — |
| Monomer | SR-501 | Sartomer Co. | 11.27 | 11.27 | 5.49 |
| Photo-initiator | Irgacure 379 | BASF | 2 | 2 | 2 |
| | Irgacure 819 | BASF | 1.39 | 1.39 | 1.39 |
| | Esacure KIP 150 | Lamberti Technologies | 3.62 | 3.62 | 3.62 |
| Stabilizer | CN3216 | Sartomer Co. | 1 | 1 | 1 |
| Rheology Modifier | Claytone HY | Southern Clay Products | 4 | 2 | 2 |
| Total Weight Percentage | | | 100 | 100 | 100 |

As illustrated in Table 2, different magenta acrylate ink compositions were obtained using substantially similar and compatible components as those in Examples C1-C5. These acrylate ink compositions had favorable pigment wetting and dispersion characteristics, and remained stable over many months without showing signs of syneresis.

Examples Y1, Y2, and Y3

Yellow acrylate ink compositions were prepared in the same manner as Example C1 using yellow pigments and the components percentages detailed in Table 3.

TABLE 3

Formulation of Example Inks Y1, Y2, and Y3

| Component | | Available from | Ink Composition Formulation | | |
|---|---|---|---|---|---|
| | | | Y1 | Y2 | Y3 |
| Pigment | Permanent Yellow DHG-CN09 (PY 12) | Clariant Corp. | 17.5 | — | — |
| | Permanent Yellow G-MX (PY 14) | Clariant Corp. | — | 17.5 | 17.5 |
| Dispersant | Solsperse 32000 | Lubrizol Corp. | 4.8 | 4.8 | 4.8 |
| Oligomer | CN294E | Sartomer Co. | 61.89 | 61.89 | 57.39 |
| | CN2256 | Sartomer Co. | — | — | 4.5 |
| Monomer | SR-501 | Sartomer Co. | 5.8 | 5.8 | 5.8 |
| Photo-initiator | Irgacure 379 | BASF | 2 | 2 | 2 |
| | Irgacure 819 | BASF | 1.39 | 1.39 | 1.39 |
| | Esacure KIP 150 | Lamberti Technologies | 3.62 | 3.62 | 3.62 |
| Stabilizer | CN3216 | Sartomer Co. | 1 | 1 | 1 |
| Rheology Modifier | Claytone HY | Southern Clay Products | 2 | 2 | 2 |
| Total Weight Percentage | | | 100 | 100 | 100 |

As illustrated in Table 3, different yellow acrylate ink compositions were obtained using substantially similar and compatible components as those in Examples C1-C5 and M1-M3 above. These acrylate ink compositions had favorable pigment wetting and dispersion characteristics, and remained stable over many months without showing signs of syneresis.

Examples K1, K2, K3, K4, and K5

Black acrylate ink compositions were prepared in the same manner as Example C1 using black pigments and the components percentages detailed in Table 4.

TABLE 4

Formulation of Example Inks K1, K2, K3, K4, and K5

| Component | | Available from | Ink Composition Formulation | | | | |
|---|---|---|---|---|---|---|---|
| | | | K1 | K2 | K3 | K4 | K5 |
| Pigment | NIPEX 150 | Orion Engineered Carbons | 17.5 | 17.5 | — | — | — |
| | MOGUL E | Cabot Corp. | — | — | 17.5 | — | — |
| | NIPEX 35 | Orion Engineered Carbons | — | — | — | 17.5 | 17.5 |
| Dispersant | Solsperse 39000 | Lubrizol Corp. | — | — | — | — | 5.25 |
| | Solsperse 71000 | Lubrizol Corp. | 5.25 | — | — | — | — |
| | Solsperse J-200 | Lubrizol Corp. | — | 5.25 | 5.25 | 5.25 | — |

TABLE 4-continued

Formulation of Example Inks K1, K2, K3, K4, and K5

| Ink Composition Formulation | | | | | | | |
|---|---|---|---|---|---|---|---|
| Component | | Available from | K1 | K2 | K3 | K4 | K5 |
| Oligomer | CN294E | Sartomer Co. | 62 | 62 | 62 | 62 | 62 |
| Monomer | SR-501 | Sartomer Co. | 5.24 | 5.24 | 5.24 | 5.24 | 5.24 |
| Photoinitiator | Irgacure 379 | BASF | 2 | 2 | 2 | 2 | 2 |
| | Irgacure 819 | BASF | 1.39 | 1.39 | 1.39 | 1.39 | 1.39 |
| | Esacure KIP 150 | Lamberti Technologies | 3.62 | 3.62 | 3.62 | 3.62 | 3.62 |
| Stabilizer | CN3216 | Sartomer Co. | 1 | 1 | 1 | 1 | 1 |
| Rheology Modifier | Claytone HY | Southern Clay Products | 2 | 2 | 2 | 2 | 2 |
| Total Weight Percentage | | | 100 | 100 | 100 | 100 | 100 |

As illustrated in Table 4, different black acrylate ink compositions were obtained using substantially similar and compatible components as those in the examples above. These acrylate ink compositions had favorable pigment wetting and dispersion characteristics, and remained stable over many months without showing signs of syneresis.

The example acrylate ink compositions above were analyzed in terms of rheology and tack. In particular, the frequency-based sweep rheologies, between applied 0.1 and 100 rad/s frequencies, of all inks were determined on a RFS-3 rheometer (available from TA Instruments) at 35° C. equipped with a 25 mm plate at a 0.5 mm gap.

Accordingly, in some embodiments, the acrylate ink composition has a near-zero shear viscosity of between $5 \times 10^5$ and $3 \times 10^7$ cps at 35° C. In other embodiments, the acrylate ink composition has near-zero shear viscosity of between $8 \times 10^5$ and $2 \times 10^7$ cps at 35° C. In yet another embodiment, the acrylate ink composition has near-zero shear viscosity of between $1 \times 10^6$ and $1 \times 10^7$ cps at 35° C.

Similarly, each of the acrylate ink compositions in the examples above was tested on an Inkometer 1100 (available from Thwing-Albert Company) to determine tack. The UV ink-rated rollers on the Inkometer were equilibrated at 32.2° C. In each case, 1.3 mL of the ink composition was applied to the distribution roller where transfer and distribution on to the other rollers was allowed to continue for 15 seconds at 150 RPM upon which time the speed of the rollers was automatically increased to 1200 RPM. Tack measurements of the ink occurred every 20 seconds for 10 minutes. Tack was measured in terms of grams-meters.

In some embodiments, the acrylate ink compositions have a tack measurement of between 25 g-m and 50 g-m at 60 seconds and 35° C. In another embodiment, the acrylate ink compositions have a tack measurement of between 35 and 45 g-m at 60 seconds and 35° C. In one embodiment, the acrylate ink composition has a tack measurement of 40 g-m at 60 seconds and 35° C.

In some embodiments, the acrylate ink composition has a mid-range viscosity at 35° C., allowing for anilox delivery. In one embodiment, the acrylate ink composition has a high tack of about 30 and 50 g-m at 35° C., enabling efficient transfer to the printing substrate and good image quality.

In some embodiments, acrylate ink compositions with a higher tack are beneficial for increased ink transfer and image quality when used in printing systems, such as digital lithographic printing systems.

In some embodiments, acrylate ink compositions in accordance with the embodiments of this disclosure are compatible with dampening fluids and imaging member or reimageable surface/plate materials of ink-based digital printing systems. For example, embodiments of the acrylate ink compositions may be immiscible in dampening fluids, such as D4, and provide low background in non-imaging areas.

In other embodiments, ink sets are formed of acrylate ink compositions having substantially similar components. In some embodiments, ink sets formed of acrylate ink compositions are mutually compatible. In other embodiments, acrylate ink compositions using similar and compatible components have similar wet-on, curing robustness, and color quality characteristics. In some embodiments, the characteristics of acrylic ink compositions in an ink set are similar not only among inks of the same color, but amount all colors in the ink set. In one embodiment, acrylic ink compositions within an ink set are processed in a similar manner in the printing system.

In order to determine the compatibility of ink sets including embodiments of acrylate ink compositions in this disclosure, the coloristic properties of the Example inks above were obtained as follows.

Some of the Example inks above (C2, M3, Y1, K2, K3 and K4) were imaged on paper in the following manner. Each of the inks were applied onto a representative portion of the reimageable surface of the imaging member 110 with a Brayer roller of Durometer 60 hardness and immediately transferred onto XEROX Digital Color Elite Gloss (DCEG) paper with a clean Brayer roller of Durometer 60 hardness at different densities such that the resultant optical densities of the cyan, magenta, yellow, and black images were between 1.5 and 1.8, respectively, after having been cured using a Fusion UV Lighthammer L6 300 W/inch curing station equipped with D bulb. The applied energy doses for UW, UVA, UVB, and UVC bands were 640, 1401, 420, and 37 mJ/cm2, respectively. The print image dimensions were about 2 cm by 3 cm.

A spectrodensitometer (X-Rite 538, available from X-Rite) was used to measure the color properties of all of the printed ink images using D50 and 2° settings. Each of the images was measured 3 times with the mean data reported in Table 6 below in terms of their CIE 1976 color space or CIELAB color space.

TABLE 6

Colohstic Data for CMYK Example Inks

| Example | Pigment Grade and C.I. Number | O.D. | L* | a* | b* | Complex Viscosity (35° C.) @ Frequency, mPa·s 0.1 rad/s | 100 rad/s | Tack at 32.2° C., g-m 60 second tack |
|---|---|---|---|---|---|---|---|---|
| C2 | HELIOGEN Blue D 7088, C.I. PB15:3 | 1.50 | 54.36 | −34.26 | −52.16 | 3.40E+06 | 1.05E+05 | 35.5 |
| M3 | Permanent Rubine L5B 01, C.I. PR57:1 | 1.52 | 44.91 | 71.07 | −8.59 | 8.49E+04 | 4.87E+04 | 46.8 |
| Y1 | Permanent Yellow DHG-CN09, C.I. PY12 | 1.51 | 90.36 | −3.10 | 105.10 | 5.35E+05 | 5.36E+04 | 41.4 |
| K2 | Nipex 150, C.I. P.Bl. 7 | 1.79 | 12.99 | 2.13 | 3.36 | 8.24E+06 | 2.01E+05 | n/a |
| K3 | Mogul E, C.I. P.Bl. 7 | 1.80 | 12.02 | 1.33 | 2.27 | 6.58E+04 | 3.85E+04 | 34.5 |
| K4 | Nipex 35, C.I. P.Bl. 7 | 1.85 | 11.97 | 0.82 | 1.03 | 8.41E+06 | 1.12E+05 | n/a |

As illustrated in Table 6, the L*a*b* coloristic data of the CMY acrylate ink compositions corresponded to their respective optical densities near 1.5. This data indicated excellent color development. The L*a*b* data of K acrylic ink compositions at a visible optical density near 1.8 and based on three different C.I. Pigment Black 7 grades, also showed an appropriate L* and the preferred near-neutral color characteristics. Accordingly, in one embodiment, acrylate ink compositions in a variety of colors and/or black pigments can be realized which are compatible and use substantially similar components while delivering desirable coloristic characteristics.

The present disclosure has been described with reference to exemplary embodiments. Although a few embodiments have been shown and described, it will be appreciated by those skilled in the art that changes may be made in these embodiments without departing from the principles and spirit of preceding detailed description. It is intended that the present disclosure be construed as including all such modifications and alterations insofar as they come within the scope of the appended claims or the equivalents thereof.

The invention claimed is:

1. A set of compatible acrylate ink compositions, comprising:
 a first acrylate ink composition, comprising a first pigment; and
 a second acrylate ink composition, comprising a second pigment;
 wherein each of the acrylate ink compositions is compatible with the other acrylate ink composition, and wherein each of the acrylate ink compositions comprises:
 30% or less by weight pigment, based on a total weight of the acrylate ink composition,
 10% or less by weight dispersant, based on the total weight of the acrylate ink composition,
 between 40% and 50% by weight of an acrylate, based on the total weight of the acrylate ink composition, and
 12% or less by weight photoinitiator, based on the total weight of the acrylate ink composition,
 wherein a viscosity of each acrylate ink composition is between $5\times10^5$ and $3\times10^7$ cps at 35° C.,
 wherein a 60 second tack of each acrylate ink composition is between 25 and 50 g-m at 35° C.,
 wherein the acrylate comprises a mixture of a tetrafunctional polyester acrylate oligomer, a propoxylated trimethylolpropane triacrylate monomer, a polyester acrylate oligomer that is different than the tetrafunctional polyester acrylate oligomer, and at least one of an ethoxylated trimethylolpropane triacrylate monomer or a monomer having functionality greater than or equal to 4.

2. The set of compatible acrylate ink compositions of claim 1, wherein each of the acrylate ink compositions further comprises:
 1.5% or less by weight stabilizer, based on the total weight of the ink composition; and
 12% or less by weight rheology modifier, based on the total weight of the ink composition.

3. The set of compatible acrylate ink compositions of claim 2, wherein each of the acrylate ink compositions comprises:
 between 10% and 20% pigment;
 between 2% and 10% dispersant;
 between 40% and 50% acrylate;
 10% or less photoinitiator;
 0.4% or less stabilizer; and
 between 1% and 5% rheology modifier,
 wherein a viscosity of each acrylate ink composition is between $8\times10^5$ and $2\times10^7$ cps at 35° C., and
 wherein a 60 second tack of each acrylate ink composition is between 35 and 45 g-m at 35° C.

4. The set of compatible acrylate ink compositions of claim 2, wherein each of the acrylate ink compositions consists essentially of:
 between 12% and 18% pigment;
 between 4% and 8% dispersant;
 between 40% and 50% acrylate;
 between 5% and 10% photoinitiator;
 between 0.1% and 0.3% stabilizer; and
 3% or less rheology modifier,
 wherein a viscosity of each acrylate ink composition is between $1\times10^6$ and $1\times10^7$ cps at 35° C., and wherein a 60 second tack of each acrylate ink composition is about 40 g-m at 35° C.

5. The set of compatible ink compositions of claim 4, wherein the photoinitiator is a free-radical photoinitiator.

6. The set of ink compositions of claim 1, wherein the first pigment is one of a cyan pigment, a magenta pigment, and a yellow pigment.

7. The set of ink compositions of claim 2, wherein the second pigment is a black pigment.

8. The set of ink compositions of claim 1, further comprising:
- a third acrylate ink composition, comprising a third pigment; and
- a fourth acrylate ink composition, comprising a fourth pigment,
- wherein the first pigment is a cyan pigment, the second pigment is a magenta pigment, the third pigment is a yellow pigment, and the fourth pigment is a black pigment, and
- wherein the first, second, third, and fourth acrylate ink compositions are co-miscible with each other.

9. The set of ink compositions of claim 1, wherein compatibility is characterized by co-miscibility and co-dispersability of the acrylate ink compositions.

10. The set of ink compositions of claim 1, wherein the polyester acrylate oligomer that is different than the tetrafunctional polyester acrylate oligomer comprises a high-viscosity di-functional acrylated polyester oligomer.

11. A set of compatible acrylate ink compositions, comprising:
- a first acrylate ink composition, comprising a first pigment; and
- a second acrylate ink composition, comprising a second pigment;
- wherein each of the acrylate ink compositions comprises:
- 30% or less by weight pigment, based on a total weight of the acrylate ink composition,
- 10% or less by weight dispersant, based on the total weight of the acrylate ink composition,
- between 40% and 50% by weight of an acrylate, based on the total weight of the acrylate ink composition, and
- 12% or less by weight photoinitiator, based on the total weight of the acrylate ink composition,
- wherein a viscosity of each acrylate ink composition is between $5 \times 10^5$ and $3 \times 10^7$ cps at 35° C.,
- wherein a 60 second tack of each acrylate ink composition is between 25 and 50 g-m at 35° C.,
- wherein the acrylate consists of a mixture of a tetrafunctional polyester acrylate oligomer, a propoxylated trimethylolpropane triacrylate monomer, and a polyester acrylate oligomer that is different than the tetrafunctional polyester acrylate.

12. The set of ink compositions of claim 11, wherein the polyester acrylate oligomer that is different than the tetrafunctional polyester acrylate oligomer comprises a high-viscosity di-functional acrylated polyester oligomer.

13. A set of compatible acrylate ink compositions, comprising:
- a first acrylate ink composition, comprising a first pigment; and
- a second acrylate ink composition, comprising a second pigment;
- wherein each of the acrylate ink compositions is compatible with the other acrylate ink composition, and wherein each of the acrylate ink compositions comprises:
- 30% or less by weight pigment, based on a total weight of the acrylate ink composition,
- 10% or less by weight dispersant, based on the total weight of the acrylate ink composition,
- between 40% and 80% by weight of an acrylate, based on the total weight of the acrylate ink composition, and
- 12% or less by weight photoinitiator, based on the total weight of the acrylate ink composition,
- wherein a viscosity of each acrylate ink composition is between $5 \times 10^5$ and $3 \times 10^7$ cps at 35° C.,
- wherein a 60 second tack of each acrylate ink composition is between 25 and 50 g-m at 35° C.,
- wherein the acrylate comprises a mixture of a tetrafunctional polyester acrylate oligomer, an ethoxylated trimethylolpropane triacrylate monomer and a polyester acrylate oligomer that is different than the tetrafunctional polyester acrylate, and at least one of a propoxylated trimethylolpropane triacrylate monomer, or a monomer having functionality greater than or equal to 4.

14. The set of ink compositions of claim 13, wherein the acrylate consists of a mixture of the tetrafunctional polyester acrylate oligomer, the ethoxylated trimethylolpropane triacrylate and the polyester acrylate oligomer that is different than the tetrafunctional polyester acrylate.

15. The set of ink compositions of claim 13, wherein each of the acrylate ink compositions comprises between 70% and 80% by weight of an acrylate, based on the total weight of the acrylate ink composition.

16. The set of ink compositions of claim 13, wherein each of the acrylate ink compositions comprises between 40% and 50% by weight of an acrylate, based on the total weight of the acrylate ink composition.

17. The set of ink compositions of claim 13, wherein each of the acrylate ink compositions do not phase separate with each other.

18. The set of ink compositions of claim 13, wherein the polyester acrylate oligomer that is different than the tetrafunctional polyester acrylate oligomer comprises a high-viscosity di-functional acrylated polyester oligomer.

* * * * *